United States Patent [19]

Todd

[11] Patent Number: 5,458,771
[45] Date of Patent: Oct. 17, 1995

[54] APPARATUS FOR THE GASIFICATION OF LIQUIDS

[76] Inventor: John J. Todd, 61 Sandy Lane, Hampshire, United Kingdom

[21] Appl. No.: 140,100

[22] PCT Filed: May 1, 1992

[86] PCT No.: PCT/GB92/00800
§ 371 Date: Nov. 2, 1993
§ 102(e) Date: Nov. 2, 1993

[87] PCT Pub. No.: WO92/19546
PCT Pub. Date: Nov. 12, 1992

[30] Foreign Application Priority Data

May 3, 1991 [GB] United Kingdom .................. 9109713

[51] Int. Cl.⁶ .................. B01F 3/04; C02F 3/20
[52] U.S. Cl. .................. 210/220; 261/122.2; 119/263
[58] Field of Search .................. 261/122.1, 122.2; 119/263; 210/220, 169

[56] References Cited

U.S. PATENT DOCUMENTS

| | | |
|---|---|---|
| 4,118,447 | 10/1978 | Richter . |
| 4,629,126 | 12/1986 | Gordy . |
| 4,631,134 | 12/1986 | Schüssler . |
| 4,734,191 | 3/1988 | Schüssler . |
| 4,764,314 | 8/1988 | Schneider . |
| 4,820,457 | 4/1989 | Jager . |
| 4,842,779 | 6/1989 | Jager . |
| 4,954,296 | 9/1990 | Ott . |
| 4,981,623 | 1/1991 | Ryan . |
| 5,093,047 | 3/1992 | Zeppenfeld . |
| 5,330,688 | 7/1994 | Downs . |

FOREIGN PATENT DOCUMENTS

| | | |
|---|---|---|
| 0174429 | 4/1985 | European Pat. Off. . |
| 3316140 | 11/1983 | Germany . |
| 61-15794 | 1/1986 | Japan . |

*Primary Examiner*—Thomas M. Lithgow
*Attorney, Agent, or Firm*—Klauber & Jackson

[57] ABSTRACT

An apertured flexible membrane (10) extends over a domed support (11). A central gas supply tube (50,82) terminates in gas outlets (51) oriented to direct the gas to flow horizontally into the space (40) between the membrane and the support to inflate the membrane away from the support so that gas from the inflated space discharges through the apertures (60) as fine bubbles and such that when the gas supply ceases the membrane collapses back into area contact with the support to seal all the apertures. This reduces clogging. The aerator is useful in the aeration of sewage or waste water and in fish or eel farms.

5 Claims, 3 Drawing Sheets

APPARATUS FOR THE GASIFICATION OF LIQUIDS

TECHNICAL FIELD

This invention relates to apparatus for the treatment of liquid media by gasification. One application of such apparatus is to the gasification of liquid media which contains organic matter degradable by the action of gases thereon, for example, the aeration or oxygenation of sewage or other waste water. Another application is in the aeration or oxygenation of the water in fish or eel farms.

BACKGROUND ART

A wide range of aeration devices have been used and described in the prior art. Oxygen does not dissolve easily or quickly in water and it is therefore in principle desirable to utilize fine bubble aerators wherein the bubbles are about 2 mm in diameter. Smaller bubbles have a larger specific surface area for oxygen transfer into the liquid, and also rise more slowly through the liquid to give a longer time for the oxygen to transfer before the bubble reaches the liquid's surface. Coarse bubble aerators are less efficient in the mass of oxygen transferred per unit of energy utilized in generating the bubbles at a chosen depth in the liquid.

One known and widely used prior art fine bubble aerator is the porous ceramic diffuser device. These devices are usually secured in fixed positions to fixed air supply pipework at the base of a treatment vessel. They are efficient in terms of oxygen transfer per unit of consumed energy, but suffer from a substantial problem of fouling and clogging. If the air supply is turned off the foul water can enter the pores and the pipework and clog them with particles of organic matter, providing a habitat for growth of organisms in the pores. Dirt particles in the air supply also tend to lodge in the fine pores. One solution is never to turn off the air supply, but this can be inflexible in terms of plant operation, undesirable in terms of controlling dissolved oxygen levels and inefficient in overall energy use. It is possible to filter the air supply but this is expensive and again leads to energy inefficiency. Another solution is regular closure and draining of the plant for cleaning and unblocking or replacement of the diffusers, again leading to significant inefficiency and expense in operation.

Another known and used prior art device is an apertured pipe or other apertured air supply structure closely covered by a porous rubber sleeve, e.g. clamped in position by adjustable bands or clips. The air supply through the pipe flows out through the apertures and tends to pressurise and inflate the porous sleeve away from the pipes so that fine bubbles issue through the pores into the liquid. When the air supply is turned off the porous sleeve can collapse back onto the pipe. The pores remain in communication with the pipe apertures and thus fouling and clogging can arise as with the porous ceramic diffusers. If the pores are made finer to reduce clogging, then correspondingly the energy loss and inefficiency in forcing the air through the pores increases, i.e. it is necessary to create a high pressure drop across the porous sleeve.

DISCLOSURE OF INVENTION

An object of the present invention is to make it possible to provide an improved fine bubble aerator retaining the advantages of fine bubble size but mitigating the above described problems of clogging, high pressure drop and inefficiency.

The document DE-A-3316140 describes apparatus for the gasification of liquids comprising a support, an apertured flexible membrane extending over said support, and gas supply means to introduce gas to flow between the membrane and the support to inflate the membrane away from the support such that gas from the inflated space discharges through the apertures as fine bubbles and such that when the gas supply ceases the membrane collapses into area contact with the support to substantially seal the apertures.

The present invention is characterized in that:

said gas supply means comprises a gas supply tube terminating in a plurality of gas outlets oriented to direct the gas to flow into the space between said membrane and said support in directions substantially parallel to said support and the membrane when substantially unflexed.

When the support is a dome, the air supply tube is suitably a vertical central tube having a plurality of said outlets directed generally horizontally in angularly spaced directions about the vertical axis.

The apparatus is preferably weighted so as to present a density significantly greater than that of the waste water, whereby the apparatus is adapted for suspension within the water in a treatment vessel. The apparatus may be suspended in a desired position by wires, chains or ropes for example, or conveniently by a gas supply hose serving also to supply gas to the gas supply means of the apparatus. The weight may be a separate ballast structure housed beneath the support, or may be formed integrally with the support.

The membrane is preferably secured to the support such that substantially the only escape route for gas from the inflated space is through said apertures. Where the support is a dome with a central vertical air supply tube from above, the membrane has a central opening to receive the tube and is sealingly secured about the periphery of the tube and also sealingly secured around the outer circumference of the domed support, for example by an inwardly turned lip extending beneath the circumference of the support and trapped in position.

BRIEF DESCRIPTION OF THE DRAWINGS

Embodiments of the invention will now be described, by way of example, with reference to the accompanying drawings, in which.

MODES FOR CARRYING OUT THE INVENTION

Figure 1:
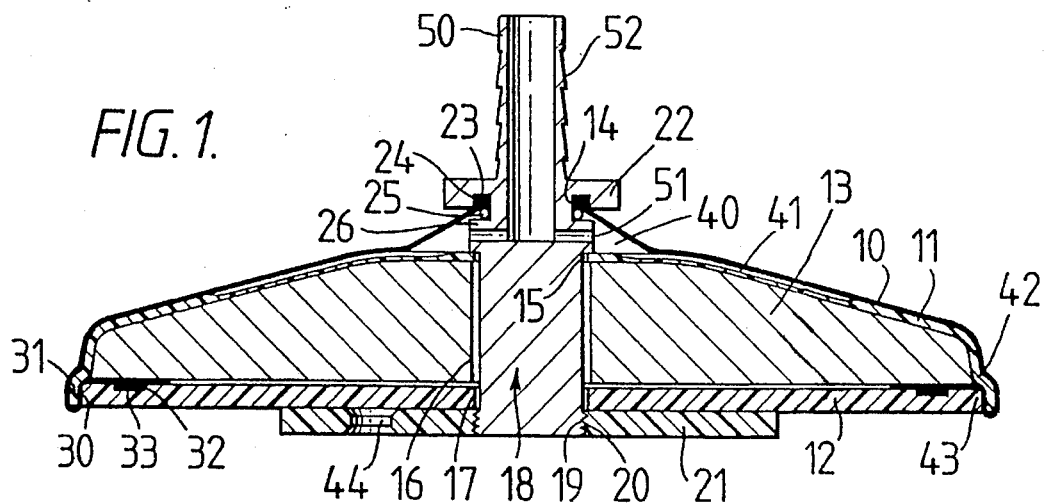
FIG. 1 is a vertical section through gasification apparatus according to the invention with the membrane in an unflexed condition.
Figure 2:
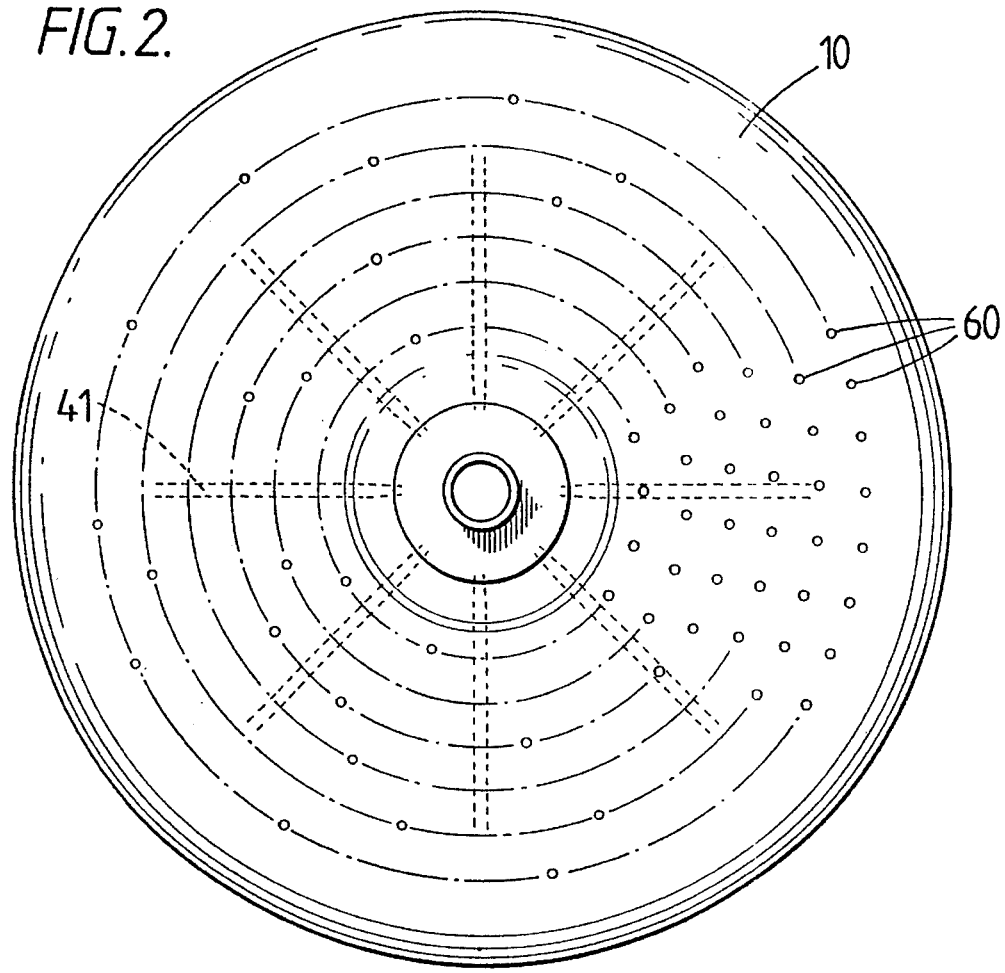
FIG. 2 is a top plan view of the apparatus of FIG. 1.

FIGS. 1 and 2 show a fine bubble aerator comprising an apertured flexible membrane 10. The membrane is suitably formed of elastomeric synthetic rubber material and preferably by moulding to the desired unflexed shape as shown in FIG. 1. The unflexed membrane fits snugly over a support member 11 in a form of a shallow circular dome suitably moulded from plastics material. A circular base plate 12 seats within the lower open end of the dome 11 and traps the outer circumference of the member 10 as described below. A solid dome-shaped ballast weight 13 is housed between the base plate 12 and the curved under-surface of the dome 11.

The membrane 10, the dome 11, the weight 13 and base plate 12 have aligned central openings 14, 15, 16, 17 on a vertical axis to receive a central spigot 18. The spigot 18 has a lower threaded portion 19 engaging a threaded opening 20 in a backing disk 21. Spigot 18 also has an upper integral flange 22 extending over the membrane 10, whereby tightening the spigot 18 onto the backing disk 21 acts to clamp the membrane, dome, weight and base plate together in a unitary assembly. The periphery of the opening 14 in the membrane is sealingly located beneath and against the under-surface of the flange 22. The opening is preferably defined by an integral collar 23 located in a groove 24 on the under side of the flange 22 and can be retained in position by a wire clip 25 encircling the spigot 18 beneath the flange 22. The under side of the periphery of the membrane opening 14 is supported clear of the dome 11 by an integral flange 26 on the spigot 18.

The outer circumference of the membrane 10 is moulded to provide an inwardly and upwardly turned lip 30 shaped to receive the outer circumference 31 of the dome and to be sealingly trapped between the periphery of the base plate 12 and the outer circumference 31 of the dome. The lip 30 has a radially inward extension trapped between the weight 13 and the base plate 12 as the assembly is tightened together. Inward extension suitably has a further sealing portion 32 sealed in a circumferentially extending groove 33 in the upper face of the base plate 12.

The central opening 15 in the dome 11 seats around the spigot 18 beneath the flange 26. The flange 26 thereby holds a limited central portion of the membrane clear of the dome, as shown by air space 40, when the membrane is in its unflexed condition. The upper surface of the dome could have a plurality, e.g., eight, of regularly angularly spaced narrow and very shallow grooves extending from the space 40 and tapering in depth and width away from space 40. A pair of these grooves are indicated in dotted lines 41 and their function is described below. The outer circumference 31 of the dome is provided with an integral indentation 42 positioned to seat over the upper circumferential corner 43 of the base plate 12 so as to sealingly trap the lip 30 of the membrane 10 between the indentation 42 and the corner 43.

The weight 13 may be formed of any suitable dense material such as yacht ballast, i.e. cast iron shot adhered in shape by a resin compound. The weight is shaped to be housed between the base portion 12 and the dome 11. The spigot 18 passes freely through the central opening 16 of the weight.

The base plate 12 may be a disk moulded from plastics material. The spigot 18 passes freely through the central opening 17. The backing disk 21 may also be moulded of plastics material and its threaded opening 20 engages the lower threaded portion 19 of the spigot 18 to clamp the assembly together when tightened. The disk 21 may have apertures 44 to aid tightening of the disk onto the spigot.

The upper end of the spigot 18 serves as gas supply means to introduce gas to flow directly between the membrane 10 and the dome 11. The upper end is in the form of a tube 50 terminating at the level of the flange 26. A plurality, e.g. six, of equally angularly spaced air outlet bores 51 extend horizontally within the flange 26 so as to communicate with the lower end of tube 50 and to open into the air space 40 between the membrane 10 and dome 11. The outer surface of the tube 50 is provided with protrusions 52 for sealing reception in the end of an air delivery hose (not shown).

In one particular embodiment the apparatus shown in FIG. 1 is about 22 cm in diameter, 5 cm in height between the top of the membrane and the under side of the backing disk, and is weighted to about 3 kg. The internal cross-sectional area of the tube 50 is about 180 mm$^2$.

The membrane is provided with a large number of apertures indicated schematically at 60 in FIG. 2. The size and positioning of the apertures depends on the size of the device and its intended use including depth of operation (typically 3 m), air supply rate (typically 5–12 m$^3$/h at atmospheric pressure) and air supply pressure (typically $7\times10^4$ pascal, i.e. 10 psi).

In the particular embodiment dimensioned as just described, the membrane is provided with about three hundred holes in six circular rows of about 7, 9, 11, 13, 15 and 17 cm diameter with about thirty holes in the inner row rising to about 50 holes in the outer row. Each hole is about 0.25 mm in diameter giving a total hole area of about 3 cm$^2$. The holes can be graded in diameter so that those in the outer row are slightly smaller in diameter than those in the inner row to compensate for the increased depths in the liquid due to the curvature of the membrane when inflated in use. In an alternative embodiment the membrane is provided with about four hundred holes of about 0.5 mm in diameter, allowing a significantly higher air supply rate.

The holes may be formed by drilling on a jig after moulding the membrane. In another form the mould may produce a membrane pre-form having cone-shaped protrusions in the desired positions of the holes. The tops of the cones are then removed after moulding to create the holes. Alternatively the holes may be cut by laser in a blank membrane, this having the advantage of great accuracy in hole placement and diameter. The provision of holes in desired positions as compared with the use of an inherently porous material, leads to increased efficiency, lower pressure drop across the aerator and less likelihood of clogging.

In use the weighted aerator is suspended within a treatment vessel in a desired position, conveniently by suspension from its own air supply hose clamped to the upper tubular end of spigot 18. Suspension eliminates the capital costs and operational inflexibility of aerators fixed in position to fixed pipework along the base of the vessel, and avoids the need for regular draining of the vessel to maintain the aerators. The aerator may be suspended so as to just rest on the base of the vessel, thus reducing the chances of accumulation of unaerated materials such as sludge in dead spaces beneath the aerator. The aerator may sit flat on the base or may in use wobble around the backing disk or a protrusion therefrom to increase the swirl in the generated air bubble pattern.

Figure 3:
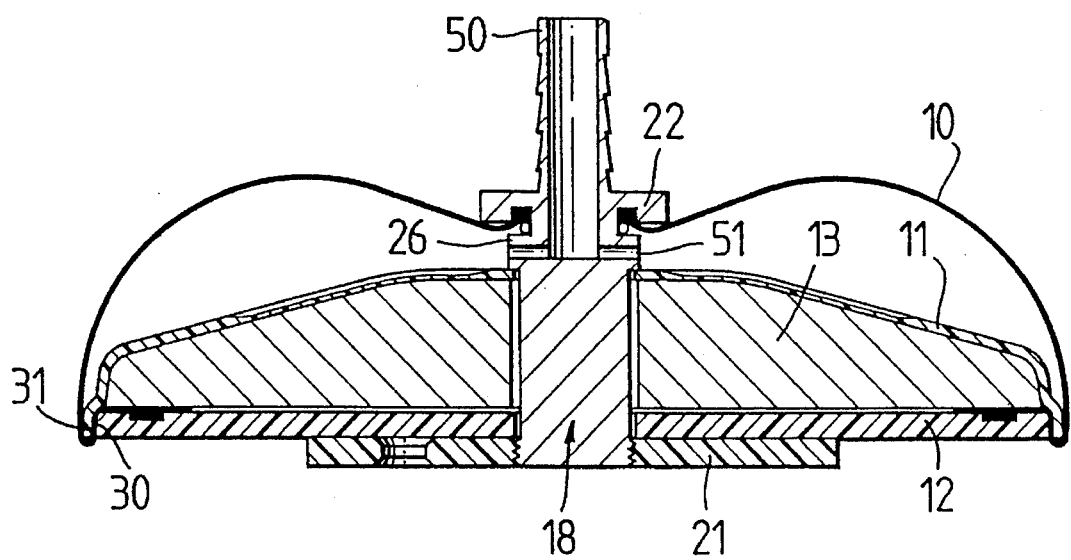
FIG. 3 is a vertical section through the apparatus of FIG. 1 with the membrane inflated away from the support.

Air, or other gas, is supplied through the hose to pass into the tube 50 and issue through the outlet bores 51 in horizontal directions substantially parallel to the central portions of the membrane 10 and the dome 11. When the air supply is off the unflexed membrane is collapsed into area contact with the dome to seal the apertures 60. The dome has a smooth continuous surface and is itself without apertures. The structure as described is such as to leave the small central annular air space 40 communicating with the very shallow grooves 41. On start-up the space 40 and grooves 41— if provided—assist the generally horizontally directed air flow to lift the membrane 10 away from its sealing position and to inflate away from the support to attain the working position shown in FIG. 3.

FIG. 2 shows that the centre of the membrane is secured by the collar 23 located in the groove 24 thereby providing for sealing of the membrane against the under surface of the flange 22, the efficiency of the sealing increasing as the air pressure increases. The outer circumference of the membrane is sealingly trapped by lip 30 between the indentation 42 and the corner 43 as described. Accordingly the only substantial escape route for air from the inflated space is through the apertures 60. An efficient fine air bubble distribution thereby results. A typical operational air pressure is up to $7 \times 10^4$ pascal (10 psi) but the described securing and sealing structure provides a significant margin of reliability up to about $35 \times 10^4$ pascal (50 psi). An advantage of the apparatus is its efficiency at low depths in waste water, e.g. 2.5 m., allowing operation where desired at lower air pressure, e.g. in the range $3 \times 10^4 - 5 \times 10^4$ pascal (4–7 psi).

Figure 4:
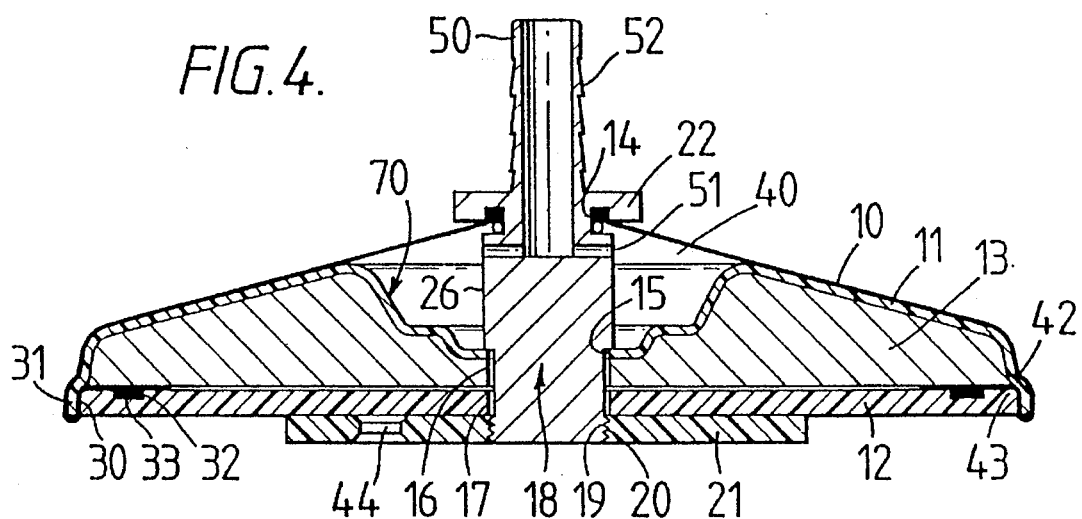
FIG. 4 is a vertical section through a modification of the apparatus of FIG. 1.

FIG. 4 shows a modification of the fine bubble aerator of FIG. 1 wherein similar features are identified by similar reference numerals. The domed support member 11 is shaped to provide a central hollow 70. The flange 26 on the spigot 18 is correspondingly axially lengthened so that the central opening 15 in the dome 11 still seats around the spigot 18 beneath the flange 26. The effect is to significantly increase the volume of the air space 40 by which the limited central portion of the membrane 10 is held clear of the dome when the membrane is in its unflexed condition.

The air space 40 thus serves as a manifold or buffer and enables easier inflation of the membrane 10 away from the support member 11 during start-up of the air flow. This permits utilization of a slightly less flexible and tougher membrane 10 and a slightly higher air supply rate, e.g. in the range 12 to 15 m³/h at atmospheric pressure. The inflated working position of the membrane is then also preferably only about half as far away from the support member as the membrane shown in FIG. 3.

A further advantage of the central hollow 70 is that the lower portion of the hollow serves as a dirt trap. The air streams out in jets horizontally from outlet bores 51 allowing any entrained dirt to fall down and accumulate in the dirt trap.

In the embodiments of FIGS. 1 to 3 and FIG. 4, the air supply is from above down into central tube 50, and the aerator is weighted with weight 13. In use the weighted aerator is suspended in the liquid within a treatment vessel, conveniently by suspension from its own air supply hose. In some situations it is alternatively convenient to mount the aerators in fixed positions to the base of a treatment vessel.

The air is then preferably supplied from fixed pipework extending along the vessel base. The fixed pipework itself can serve as the support for mounting the aerators and thus the air is desirably supplied from beneath the aerator. The present aerators offer reduced likelihood of clogging, and fixed installation can therefore more readily be considered.

Figure 5:
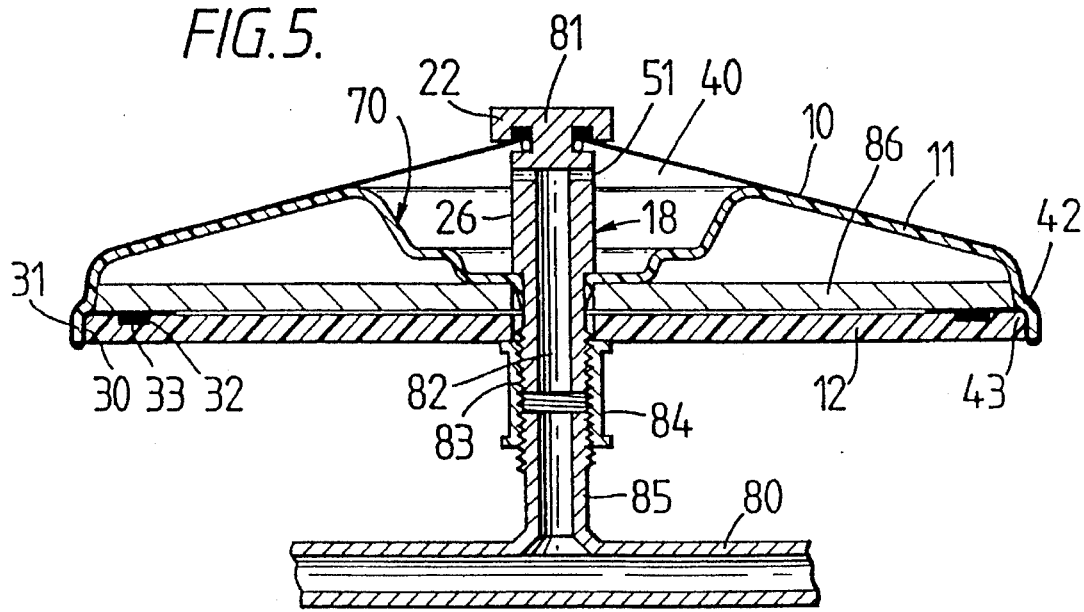
FIG. 5 is a vertical section through a further modification of the apparatus of FIG. 1.

FIG. 5 shows a further modification of the fine bubble aerator, adapted for mounting directly to fixed pipework 80 extending along the base of a treatment vessel. Similar features are identified by similar reference numerals from FIGS. 1 and 4. It will be seen that the support member 11 is shaped to provide a central hollow 70 as in FIG. 4, and the membrane 10 is the same as shown in FIGS. 1 and 4.

The spigot 18 is similar to the FIG. 4 spigot 18 in its external flanges 22 and 26 for mounting and locating the membrane 10 and the support member 11, and in its air outlet bores 51. However, the upper end portion 81 of the spigot is solid, and a central bore 82 extends downwardly from bores 51 instead of upwardly as in FIGS. 1 and 4. The lower portion of the spigot is externally threaded at 83 for threaded engagement in a collar 84 which is in turn adapted for mounting to a threaded outlet 85 of the fixed pipework 80. Thus air flowing along pipework 80 can pass upwardly through the bore 82 and discharge through the outlet bores 51, and the aerator is also thereby fixed in position.

The aerator of FIG. 5 does not require weighting and thus the weight 13 is preferably omitted, leaving an air space. The weight is replaced by a disc 86 suitably formed of corrosion-resistant metal such as stainless steel or plastics-coated steel. The base plate 12 is similar to that shown in FIG. 1 and 4. The outer circumference of the membrane 10 is shaped as described in FIG. 1 and is trapped between the disc 86 and the base plate 12 in a similar manner as it is trapped in FIG. 1 between the weight 13 and the base plate 12. In this embodiment tightening of the collar 84 onto the base plate 12 acts to clamp the membrane 10, dome 11, disc 86 and base plate 12 together in a unitary assembly. In particular, the central portions of the base plate 12 and disc 86 become clamped between the collar 84 and the lower surface of the elongate flange 26.

The arrangement of FIG. 5 permits efficient interchangeable utilization of the components. The membrane 10, support 11, base plate 12 and disc 86 can be utilized with either an upward air supply spigot as shown in FIG. 5 or with a downward air supply spigot as shown in FIGS. 1 and 4. Moreover, the arrangement of the membrane 10, support 11, base plate 12 and disc 86 with upward or downward spigot, can be used with or without the weight 13. In FIG. 5 the weight 13 would simply occupy the space beneath the domed support member 11 above the disc 86. The presence of the disc 86 permits use of weight 13 in the form of loose, e.g. granular, material such as waste iron or steel dust. A number of discs 86 of different thicknesses may be provided to accommodate different volumes, and thus masses, of weight 13. The presence of a steel disc 86 and an iron or steel weight 13 permits the employment of permanent magnet locators set in the base of a treatment vessel, so as to tend to retain suspended weighted aerators in effectively fixed positions located on the base of the treatment vessel.

INDUSTRIAL APPLICABILITY

Applications of the described apparatus are to the gasification of liquid media which contain organic matter degradable by the action of gases thereon, for example the aeration or oxygenation of sewage or other waste water. Other applications are in the aeration or oxygenation of the water in fish or eel farms.

I claim:

1. Apparatus for the gasification of liquids comprising:
   a substantially circular upwardly domed support member having an upper surface;
   an apertured flexible membrane extending over said upper surface of said support member, said membrane being molded to a desired unflexed shape to fit snugly over said upper surface of said support member in area contact therewith to substantially seal the apertures in said membrane when the membrane is in said unflexed shape;
   gas supply means to introduce gas to flow between the membrane and the support member to inflate the membrane away from the support member to thereby create an inflated space such that gas from the inflated space discharges through the apertures of the membrane as fine bubbles and further such that when the gas supply ceases, the membrane collapses back into its unflexed shape in said area contact with the support member; and means for holding a limited unapertured central portion of the membrane clear of the support member so as to define an air space, said gas supply means comprising a gas supply tube terminating in a plurality of gas outlets oriented so as to direct the gas to flow into said air space in directions substantially parallel to said support member and to said membrane when the membrane is substantially unflexed.

2. Apparatus according to claim 1 wherein said domed support member has a central hollow, and said gas outlets are positioned to introduce gas into the upper portion of said central hollow, whereby the lower portion of said hollow provides a dirt trap.

3. Apparatus according to claim 1 wherein said apparatus is weighted to present a density significantly greater than that of a liquid to be treated by the apparatus, and wherein said gas supply tube extends vertically upwardly from between the membrane and the support member through a central sealed opening in the membrane, said gas supply tube being adapted to connection to a gas supply hose adapted to suspend the weighted apparatus in the liquid to be treated.

4. Apparatus according to claim 1 wherein said gas supply tube extends vertically downwardly through a central opening in said support, said gas supply tube being adapted for connection to fixed pipework in a liquid treatment vessel to secure the apparatus in position.

5. Apparatus for the gasification of liquids comprising:

a support comprising an upwardly domed support member having a lower open end and an upper surface;

an apertured flexible membrane extending over said support member upper surface, said membrane having an outer circumference;

gas supply means to introduce gas to flow between the membrane and the support member to inflate the membrane away from the support to thereby create an inflated space such that gas from the inflated space discharges through the apertures of the membrane as fine bubbles and further such that when the gas supply ceases, the membrane collapses into area contact with the support member to substantially seal the apertures, said gas supply means comprising a gas supply tube terminating in a plurality of gas outlets oriented to direct the gas to flow into an air space present between the membrane and the support member in directions substantially parallel to said support member and the membrane when the membrane is substantially unflexed; and a substantially circular base plate seated within the lower open end of said support member, said outer circumference of the membrane being turned upwardly and inwardly and being sealingly trapped between the support member and the circumference of the base plate.

* * * * *